(12) United States Patent
Graham (10) Patent No.: US 12,073,210 B2
(45) Date of Patent: Aug. 27, 2024

(54) CONTEXT-AWARE UNDO-REDO SERVICE OF AN APPLICATION DEVELOPMENT PLATFORM

(71) Applicant: UiPath Inc., New York, NY (US)

(72) Inventor: Bridgette Graham, Gauteng (ZA)

(73) Assignee: UiPath Inc., New York, NY (US)

( * ) Notice: Subject to any disclaimer, the term of this patent is extended or adjusted under 35 U.S.C. 154(b) by 145 days.

(21) Appl. No.: 16/910,305

(22) Filed: Jun. 24, 2020

(65) Prior Publication Data

US 2021/0405999 A1 Dec. 30, 2021

(51) Int. Cl.
*G06F 9/44* (2018.01)
*G06F 8/71* (2018.01)

(52) U.S. Cl.
CPC ..................... *G06F 8/71* (2013.01)

(58) Field of Classification Search
None
See application file for complete search history.

(56) References Cited

U.S. PATENT DOCUMENTS

| | | | |
|---|---|---|---|
| 7,207,034 B2 | 4/2007 | Burke et al. | |
| 8,170,901 B2 | 5/2012 | Shukla et al. | |
| 9,075,916 B1 * | 7/2015 | Bienkowski | G06F 11/3664 |
| 9,329,762 B1 * | 5/2016 | Schultz | G06F 40/106 |
| 10,452,497 B2 | 10/2019 | Straub et al. | |
| 2004/0260718 A1 * | 12/2004 | Fedorov | G06F 9/44505 |
| 2004/0260974 A1 | 12/2004 | Livshits et al. | |
| 2009/0100443 A1 | 4/2009 | Bohle et al. | |
| 2010/0049628 A1 | 2/2010 | Mannava et al. | |
| 2011/0107246 A1 | 5/2011 | Vik | |
| 2013/0123952 A1 | 5/2013 | Reid et al. | |
| 2013/0263024 A1 | 10/2013 | Solove et al. | |
| 2015/0039566 A1 * | 2/2015 | Baumann | G06F 11/1446 707/684 |

(Continued)

OTHER PUBLICATIONS

Ben Pines, "Introducing History: Easily Undo/Redo Changes in Editor", Aug. 2017, https://elementor.com/blog/undo-redo-history/ (Year: 2017).*

(Continued)

*Primary Examiner* — Wei Y Zhen
*Assistant Examiner* — Lanny N Ung
(74) *Attorney, Agent, or Firm* — Volpe Koenig (57) ABSTRACT

A computing device is disclosed herein. The computing device includes a memory that stores processor executable instructions for an application development platform and a context-aware undo-redo service of the application development platform. The computing device includes a processor that executes the processor executable instructions to cause the computing device to receive a first invocation of an undo operation with respect to environment variables on screens. The computing device further navigates, according to an active context, to a configuration screen of the screens to make the configuration screen visible in response to the first invocation. The configuration screen shows a portion of the environment variables. The computing device also receives a second invocation of the undo operation and executes the undo operation in response to the second invocation to reverse changes to the portion of the environment variables shown by the configuration screen while the configuration screen is visible.

14 Claims, 6 Drawing Sheets

(56) References Cited

U.S. PATENT DOCUMENTS

2015/0339127 A1* 11/2015 Lee .................... G06F 9/44505
713/1

OTHER PUBLICATIONS

Pines, Ben, Introducing History: Easily Undo / Redo Changes in Editor. Printed Aug. 27, 2017.
Github, "Feature request—undo after moving cursor should optionally just put the cursor back, without undoing. Issue #34093," pp. 1-2 (Oct. 20, 2017) available at https://github.com/microsoft/vscode/issues/34093 (retrieved Nov. 29, 2022).
Wikipedia, "Configuration file," pp. 1-4 (Jun. 14, 2020) available at https://en.wikipedia.org/w/index.php?title=configuration_file&oldid=962529941 (retrieved Nov. 29, 2022).

* cited by examiner

CONTEXT-AWARE UNDO-REDO SERVICE OF AN APPLICATION DEVELOPMENT PLATFORM

BACKGROUND

Application design software includes configuration features, such as an undo feature or a redo feature. Generally, when working within application design software on an application project, the undo feature reverses any recent changes to a configuration of the application project by removing present settings of the configuration and reverting to previous settings of the configuration. The redo feature, which is used after the undo feature, returns the recent changes to the configuration of the application project so that the removed present settings of the undo feature are again implemented.

In conventional application design software, the undo and the redo features are applicable to configure settings of the application project across multiple screens and/or software windows. For instance, there are circumstances where the application project changes without user awareness because properties associated with these changing settings are hidden or part of a different screen (e.g., a screen that is not a current, active screen). In turn, the undo and the redo features can cause confusion for the user, as well as unintended modifications and configuration issues of the application project, when the user is not clear on where in the application project the changes are being made. Confusion and unintended modifications, along with the conventional application design software's inability to methodically guide users through multiple screens and the undo and redo features, provide a bad user experience.

SUMMARY

According to an embodiment, a computing device is provided. The computing device includes a memory that stores processor executable instructions for an application development platform and a context-aware undo-redo service of the application development platform. The computing device includes a processor that executes the processor executable instructions to cause the computing device to receive a first invocation of an undo operation with respect to environment variables on screens. The computing device further navigates, according to an active context, to a configuration screen of the screens to make the configuration screen visible in response to the first invocation. The configuration screen shows a portion of the environment variables. The computing device also receives a second invocation of the undo operation and executes the undo operation in response to the second invocation to reverse changes to the portion of the environment variables shown by the configuration screen while the configuration screen is visible.

According to one or more embodiments, the computing device embodiment above can be implemented as a method, an apparatus, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

Disclosed herein is a context-aware undo-redo service of an application development platform according to one or more embodiments. The context-aware undo-redo service and the application development platform are processor executable code or software that are necessarily rooted in process operations by, and in processing hardware of, a computing system or environment (e.g., the computing system or environment 140 of FIG. 1C) to determine and apply an active context respective to undo and/or redo commands. Thus, according to one or more embodiments, the context-aware undo-redo service provides a specific configuring and tooling robotic process automation method for the application development platform of the computing system or environment. This specific configuring and tooling robotic process automation method involves a multi-step data manipulation of configuration settings and screens (and/or software windows) of an application project in connection with the undo and/or redo commands and the active context (e.g., user interface circumstances, as described herein).

In this regard and in operation, the context-aware undo-redo service tracks the active context of a user interface, in real time, as a user manipulates the application project so that application project changes by the undo and/or redo commands are with full user awareness. For example, a model or form is configured using any application development platform, which includes properties/variables on applications, orchestrator process integrations, data sources, etc. When a property/variable changes on the model or the form, a snapshot is taken of a state of the user interface (e.g., which panels are open, which are closed, which property sections are exposed, what object is currently selected, etc.). This snapshot is then associated with that property/variable change and recorded by the context-aware undo-redo service. Note that this change could be a single property/variable that changed, or an entire set of properties/variables that are changing together. Thus, when an undo and/or a redo operation is requested, the underlying application development platform allows for a reversion or restoration of the user interface as at the time the undo and/or the redo operation was recorded (e.g., panels that were open but are closed, are now be re-opened, and models that were selected are re-selected).

The technical effects and benefits of the context-aware undo-redo service include eliminating unintended modifications of the application project respective to the conventional undo and redo features. The technical effects and benefits of the context-aware undo-redo service also include an increased visibility of any changes and improved user guidance (thereby creating a better user experience with less confusion). For instance, the user sees what the user interface looked like before changes were made to the properties/variables, which assists the user in understanding a context of where changes were made and what those changes were.

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
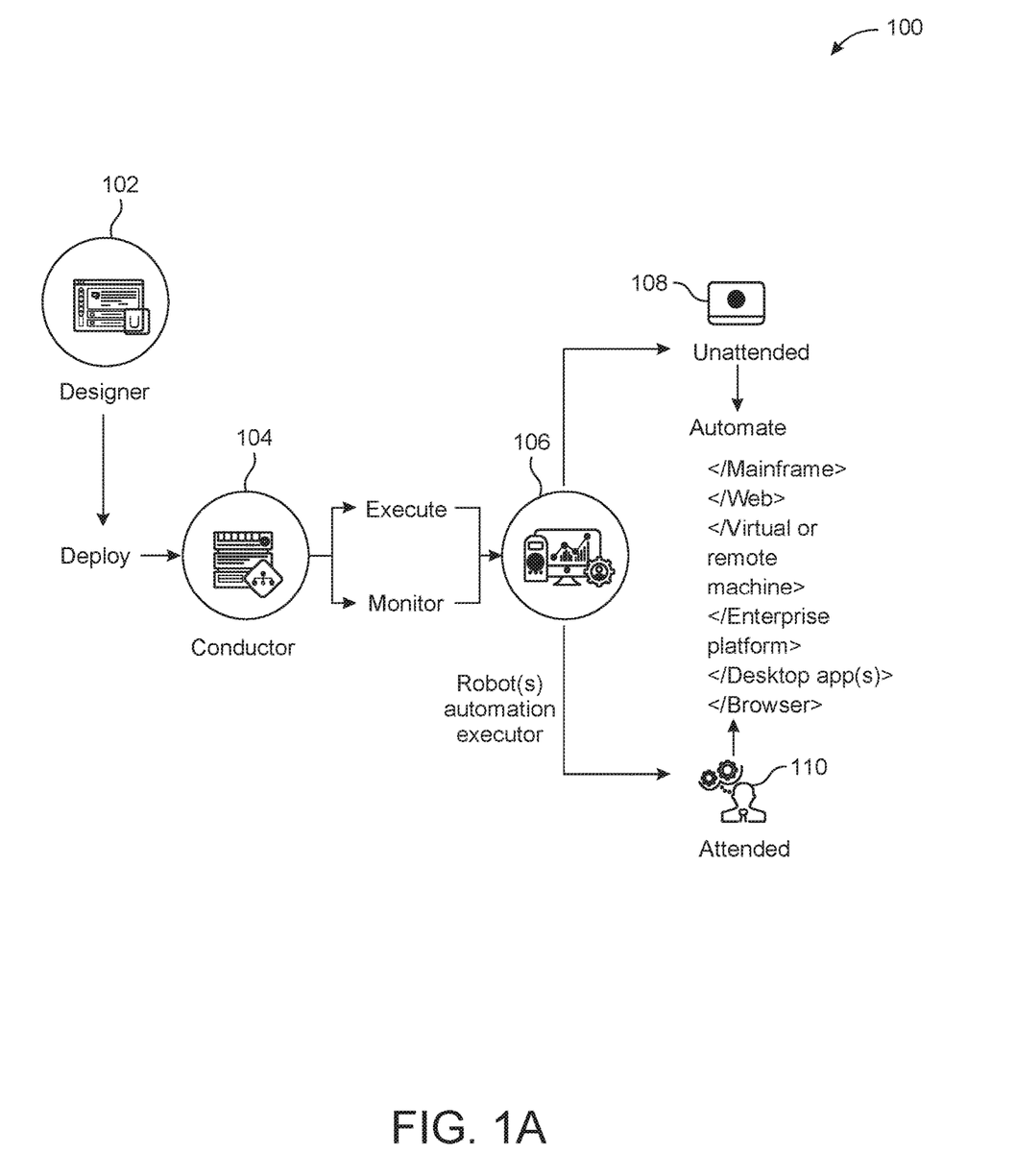
FIG. 1A is an illustration of robotic process automation (RPA) development, design, operation, or execution according to one or more embodiments.

FIG. 1A is an illustration of robotic process automation (RPA) development, design, operation, or execution 100. Designer 102, sometimes referenced as a studio, development platform including one or more engines (e.g., an undo engine), development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
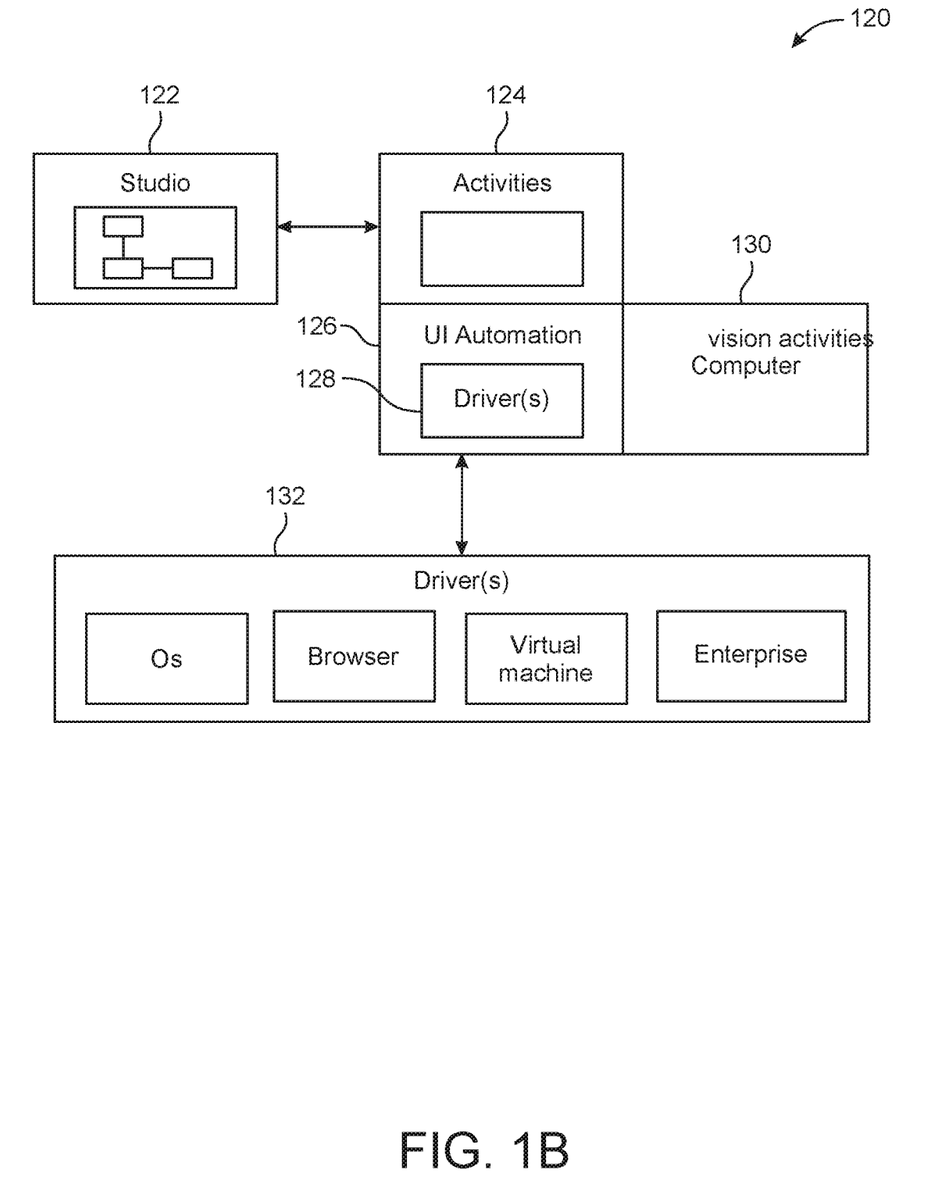
FIG. 1B is another illustration of RPA development, design, operation, or execution according to one or more embodiments.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
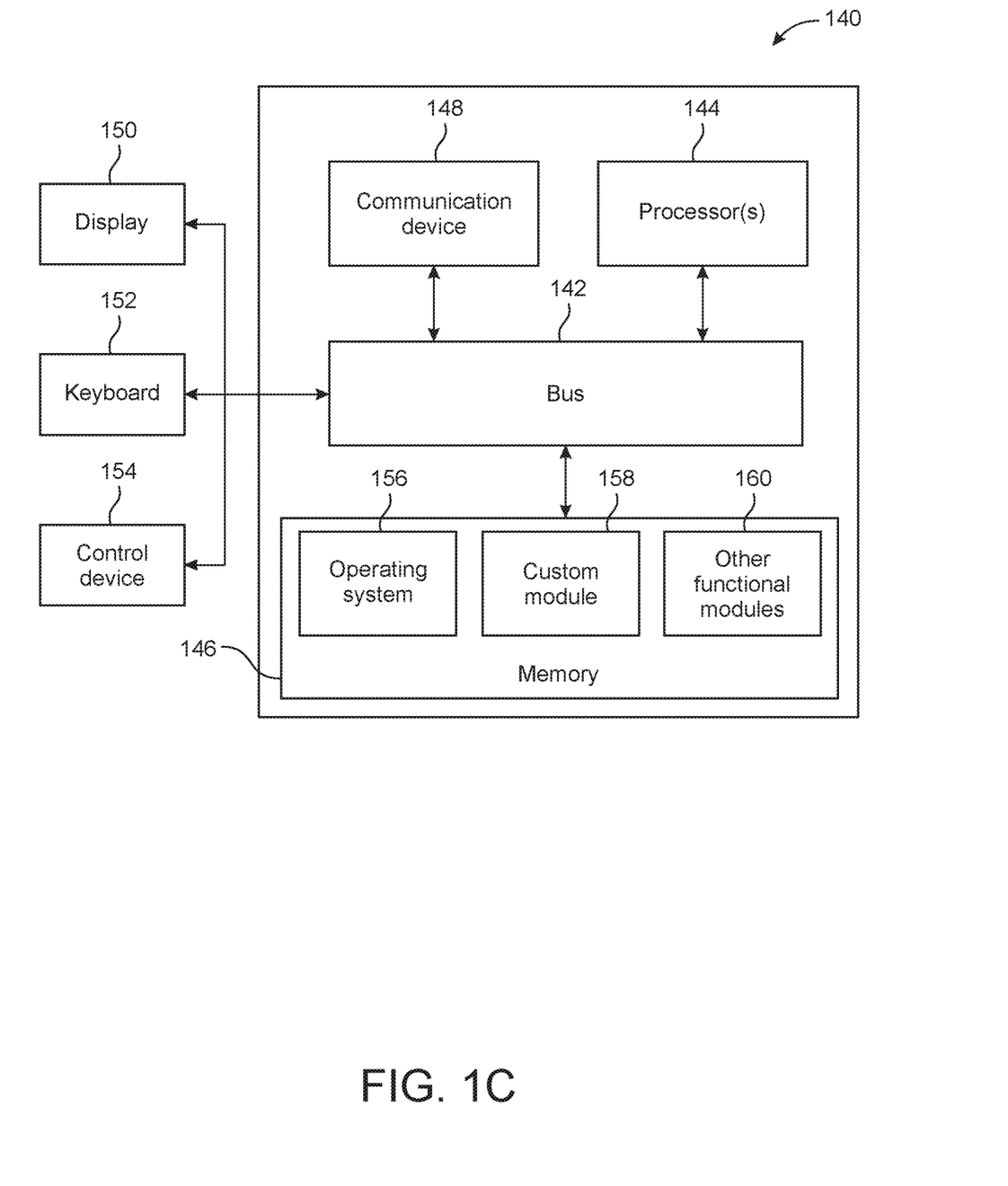
FIG. 1C is an illustration of a computing system or environment according to one or more embodiments.

FIG. 1C is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality. For example, the context-aware undo-redo service can be implemented in one or more of the modules 158 and 160 to provide a specific configuring and tooling robotic process automation method to the computing system or environment 140.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Figure 2:
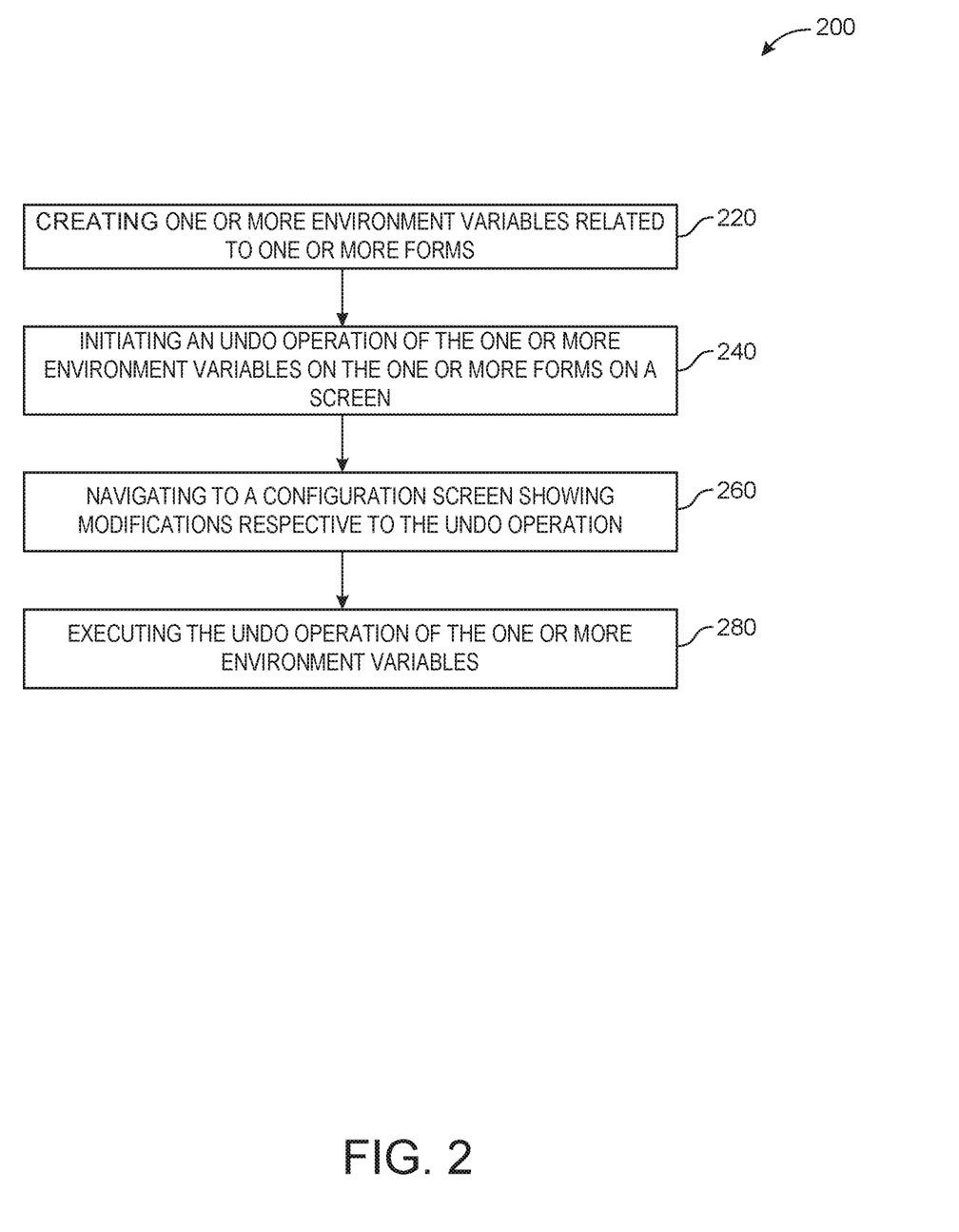
FIG. 2 is a block diagram illustrating a process flow executed by a computing system or environment according to one or more embodiments.

Turning now to FIG. 2, a block diagram illustrating a process flow 200 executed by a computing system or environment (e.g., the computing system or environment 140 of FIG. 1C) according to one or more embodiments. The process flow 200 is an example implementation of a method for context-aware undo operations by the context-aware undo-redo service executing in an application development platform (e.g., the designer 104 and/or the conductor 106 of FIG. 1A). Note that process flow 200 is not limited to context-aware undo operations and is applicable to context-aware redo operations.

In accordance with one or more embodiments, the context-aware undo operations and the context-aware undo-redo service are implemented by computer code and/or programming language, such as Java Script and/or Typescript. Further, the context-aware undo operations and the context-aware undo-redo service can be part of a model object framework. A model object framework, for example, is an event model built into a codebase where changes, context changes, and undo/redo operations are initiated (e.g., the core Model Object Framework is a fundamental part of an "Apps Builders" experience and all features can utilize the context-aware undo-redo service). For instance, the context-aware undo-redo service houses a source of truth with regards to an application project that a user is designing (i.e., snapshots or active context of a user interface of the application development platform).

In general and in accordance with one or more embodiments, the context-aware undo-redo service keeps the user apprised about what is happening to their configuration of the artifacts and what properties get updated. If the user chooses to undo some of the changes, the context-aware undo-redo service displays the correct context (e.g., configuration panels) associated with the changes that are about to be undone, so that the user is able to see these changes within a user interface and understand an impact of the undo (or redo) operation immediately and visually. In contrast, with conventional application design software (e.g., most online editors), when the user initiates the undo of the changes, the conventional application design software changes a value back to the previous value by simply changing any underlying object models. In some cases with the conventional application design software, these changes are coupled with specific areas of the user interface where the changes could be visible. As the user continues with undo/redo features within the conventional application design software, the user interface is unable to show the different places were changes are made, and the context of the different artifacts that the user is building and configuring are not be visible.

Thus, the process flow 200 contemplates issues with configuration changes, which may or may not be visible to a user, related to undo/redo operations after the user has navigated away from a specific screen (e.g., a previous configuration panel). To overcome these issues, the process flow 200 enables navigation to the specific screen where modifications are needed and implements the configuration changes accordingly.

The process flow 200 begins at block 220, where one or more environment variables related to one or more forms are created. The one or more forms can include shapes, visual appearances, and/or configurations of fields of an object that can receive and store, as inputs, the one or more environment variables. The one or more forms may be displayed within one or more screens (and/or software windows of the user interface) of the application development platform. The one or more environment variables may be resident within each of the one or more forms and can be any alpha-numeric value and/or range. In operation, as configuration changes are made to the one or more variables (e.g., the alpha-numeric value and/or range is altered), an undo engine of the application development platform records the active context (e.g., takes a snapshot), which includes the configuration changes. Note that the undo engine comprises software adapted to control and implement the undo and redo operations, along with recording and utilizing the active context.

In accordance with one or more embodiments, the active context is a set of user interface circumstances. More particularly, the active context is a stack of circumstances of the application development platform, the user interface thereof, and the configuration changes made thereto. The active context can be recorded in a suitable form and/or organized within any suitable type of data structure stored in a memory (e.g., the memory 146 of FIG. 1C). As noted herein, in some cases, the active contact can be referred to as a snapshot of a user interface.

Examples of the stack of circumstances include, but are not limited to, a number of screens, an indication of which screen is being displayed or visible, and an indication of which screens are not being displayed or not visible. Examples of the stack of circumstances also include, but are not limited to, an indication of which screens are open and/or minimized, an indication of one or more forms being displayed by the screens, and a number of forms per screen. Examples of the stack of circumstances also include, but are not limited to, one or more fields of the screens or the forms, one or more environment variables for the screens or the forms, and one or more environment variables within the fields. Examples of the stack of circumstances also include, but are not limited to, configuration panels (e.g., a type of screen), artifacts, and specification fields/variables/settings.

For ease of understanding, artifacts may be representatively used for one or more aspects of the stack of circumstances herein. Note that an artifact can be a complex data object or application that describes automated behavior or control sequences, such as database requests, grammar rules, and/or user-generated content. Further, note that undo and redo functionality is available with respect to the artifacts (i.e., one or more aspects of the stack of circumstances).

The configuration changes can be alterations to the stack of circumstances by user activity based on user inputs and/or automation activity performed without third party inputs or control. In accordance with one or more embodiments, the configuration changes and the stack of circumstances are recorded within the scope of tracking the active context of the application development platform as the configuration changes are made. For example, with the application development platform, as a user creates, builds, and configures artifacts for an application project with one or more configuration panels, the changes made to those artifacts within the configuration panels is recorded/tracked in the active context data structure.

At block 240, the undo engine of the application development platform initiates an undo operation (e.g., a first invocation thereof) of the one or more environment variables on the one or more forms on a screen. The undo operation can be triggered by a user input and/or automation activity.

In accordance with one or more embodiments, if the screen is a current configuration panel (e.g., currently visible) and modifications respective to the undo operation need to be performed in the current configuration panel, then corresponding configuration changes are executed and displayed instantly (e.g., upon and contemporaneous with the first invocation of the undo operation). In turn, the process flow 200 may end.

In accordance with one or more embodiments, if the screen is not the current configuration panel (as in the application development platform experienced a subsequent navigation away from the previous configuration panel where the modifications were made, by way of user or automatic action), the process flow 200 may proceed to block 260.

At block 260, subsequent to the navigation away from the screen, the application development platform navigates to a configuration screen (e.g., a previous configuration panel) showing the modifications respective to the undo operation. The modifications respective to the undo operation can be for the one or more environment variables. In accordance with one or more embodiments, when the undo operation is invoked for the first time, the application development platform navigates back to the previous configuration panel where last actions, configuration changes, or modifications to the one or more variables were performed.

For example, when undoing configurations after the user has navigated away from a specific screen, the undo engine navigates the user back to the correct configuration screen and property that is being undone. In this way, the user is able to see, on the screens that are open by the underlying context-aware undo-redo service, the changes that are applied. Note that, the correct screens are open before the undo operation is executed, ensuring the user can see the configuration as it currently stands, and then, upon a second invocation of the "undo" operation, the changes are made. The user is always able to see exactly which part of the artifact that the user is working on and modifying by the undo/redo operation.

At block 280, the application development platform executes the undo operation of the one or more environment variables based on information on the configuration screen. In accordance with one or more embodiments, upon a second invocation of the undo operation the configuration changes are implemented at the previous configuration panel. Thus, through one or more invocations of the undo operation, any recent changes are visibly reversed.

In view of the process flow 200 and the disclosure herein, as a user builds an application project, artifacts are added and updated to a model while the user designs the application project per a set of specification specifications. In this regard, the user might open a section called "Size" where the user can modify the size of a form button. The user could then open up a different section called "Position", where the user can change the position of the control. When the user invokes an undo operation, the user is taken to the "Position" screen where the user can see the current values before the user applies the operation. Then if the user continues with another undo operation, the "Size" screen is opened so that the user can see that the size of the control is a next portion that is modified. This "stack" of operations can be many levels deep, and for each item, the user is always directed to the correct user interface context (i.e., the correct screen based on the active context) where the changes are applied.

Figure 3:
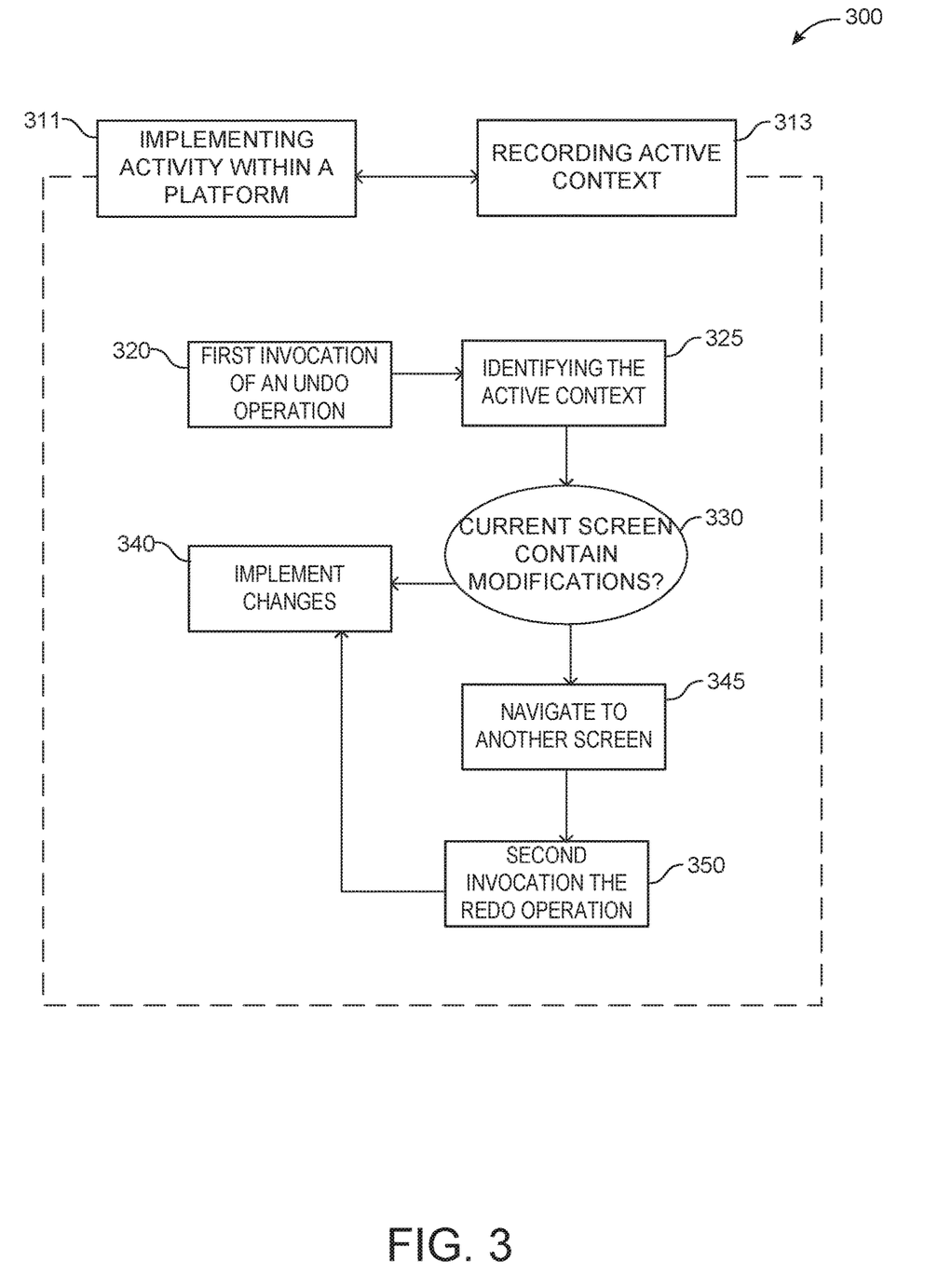
FIG. 3 is a block diagram illustrating a process flow executed by a computing system or environment according to one or more embodiments.

Turning now to FIG. 3, a block diagram illustrating a process flow 300 executed by a computing system or environment (e.g., the computing system or environment 140 of FIG. 1C) according to one or more embodiments. The process flow 300 is an example implementation of a method for context-aware undo operations by the context-aware undo-redo service executing in an application development platform (e.g., the designer 104 and/or the conductor 106 of FIG. 1A). The process flow 300 contemplates issues with configuration changes and user experience as described herein. To overcome these issues, the process flow 300 enables navigation to between screens where modifications are needed and implements the configuration changes accordingly.

The process flow 300 begins at blocks 311 and 313, where the application development platform monitors activity (within the application development platform) and records an active context of the activity. The operations of blocks 311 and 313 can be simultaneous and continuous. For example, as attended or unattended activity builds, alters, and/or configures an application project, the context-aware undo-redo service (which includes an undo engine) monitors the attended or unattended activity and records the active context (e.g., a stack of circumstances of the application project, as described herein).

In turn, as shown by block 320, an undo operation experiences a first invocation. The first invocation can be a user input and/or automation activity. At block 325, in response to the first invocation of the undo operation, the undo engine to identifies the active context.

That is, the undo engine identifies as the active context the most recent configuration changes to the application project and the stack of circumstance associated with the most recent configuration changes. The stack of circumstances further includes an identification of the one or more screens that include the most recent configuration changes. For example, when adding a new control to the application project, various configuration panels display various properties of the new control. The most recent configuration changes may include alterations to these properties.

Next at decision circle 330, the undo engine determines whether a current screen (e.g., a screen presently displayed by a user interface) contains the most recent configuration changes. That is, while the application development platform navigates/switches between the configuration panels, the active context can determine if the most recent configuration changes are shown/reflected/displayed in a configuration panel being displayed.

If the current screen contains the most recent configuration changes, then the process flow proceeds to block 340. At block 340, the most recent configuration changes are reversed. For instance, one or more forms may be displayed within one or more screens (e.g., the configuration panels) of the application development platform and the one or more environment variables resident there within are reversed.

If the current screen does not contain the most recent configuration changes, then the process flow proceeds to block 345. At block 345, the undo engine navigates to another screen that includes the most recent configuration changes (e.g., navigates to a screen showing changes for the one or more environment variables). For instance, one or more forms containing one or more environment variables that were recently changed may be displayed within one or more other screens (e.g., a configuration panel not presently shown) and the undo engine navigates to those one or more other screens.

At block 350, the undo operation experiences a second invocation. The second invocation can be a user input and/or automation activity.

Next, the process flow proceeds to block 340 and in response to the second invocation of the undo operation, the most recent configuration changes are reversed. In this case, the used can directly witness and verify the reversal of the most recent configuration changes. Note that during each invocation of the undo operation and with respect to each implemented change, the application development platform monitors activity within the application development platform and records an active context of the activity (as shown by blocks 311 and 313).

The process flow 300 may loop to move in a first direction through multiple levels of changes. Further, at any point during the process flow 300, a redo operation as described with respect to FIG. 4 can be implemented to move in an opposite direction to the first direction through multiple levels of changes.

Figure 4:
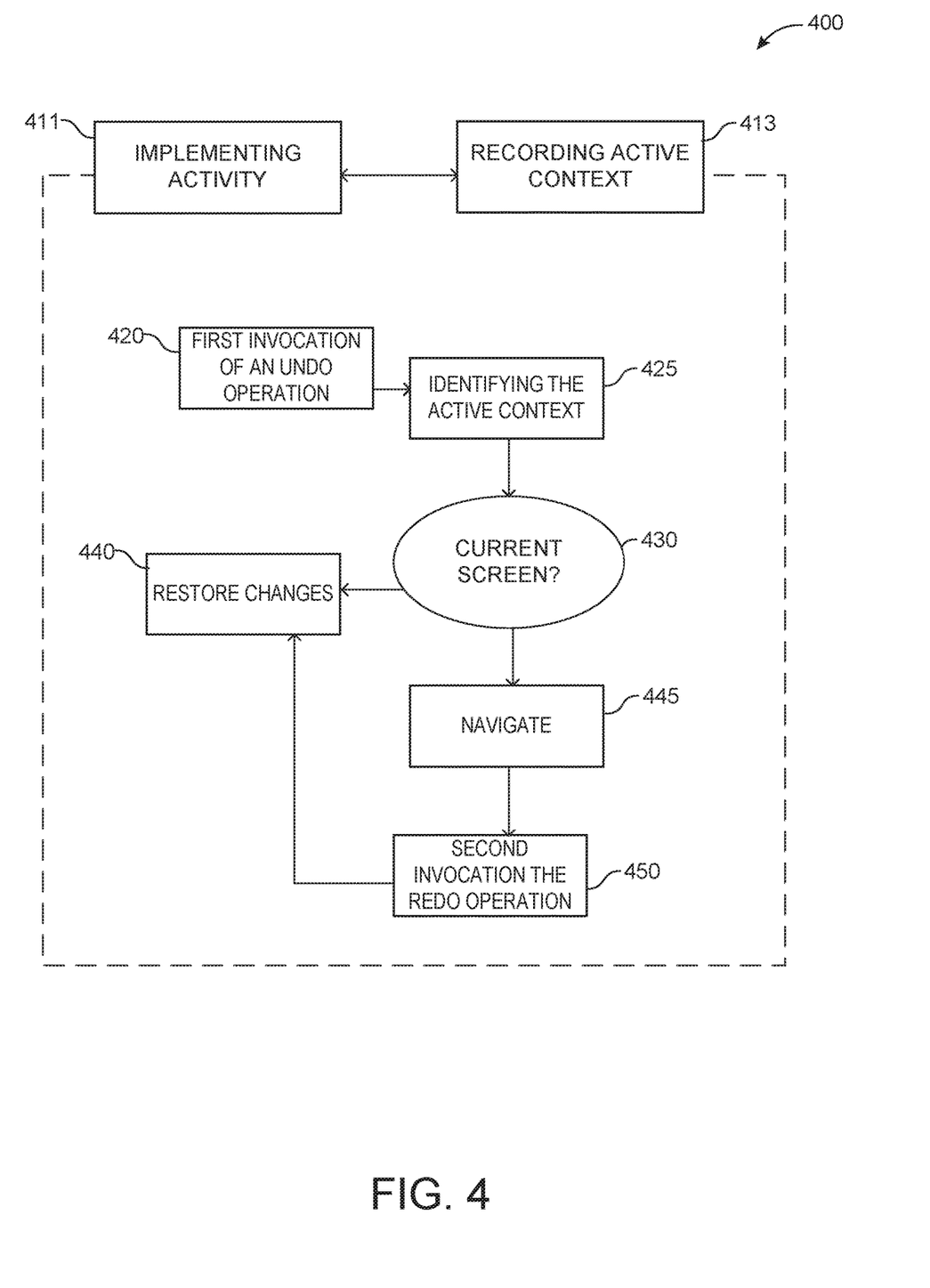
FIG. 4 is a block diagram illustrating a process flow executed by a computing system or environment according to one or more embodiments.

Turning now to FIG. 4, a block diagram illustrating a process flow 400 executed by a computing system or environment (e.g., the computing system or environment 140 of FIG. 1C) according to one or more embodiments. The process flow 400 is an example implementation of a method for context-aware redo operations by the context-aware undo-redo service executing in an application development platform (e.g., the designer 104 and/or the conductor 106 of FIG. 1A). The process flow 400 contemplates issues with configuration changes as described herein. To overcome these issues, the process flow 400 enables navigation to between screens where modifications are needed and implements the configuration changes accordingly.

The process flow 400 begins at blocks 411 and 413, where the application development platform monitors activity (within the application development platform) and records an active context of the activity. The operations of blocks 411 and 413 can be simultaneous and continuous. The operations of blocks 411 and 413 include one or more undo operations and recording of the active context with respect to those operations according to the process flow of FIG. 3.

In turn, as shown by block 420, a redo operation experiences a first invocation (e.g., user input activating a redo operation). The first invocation can be a user input and/or automation activity.

At block 425, in response to the first invocation of the redo operation, the undo engine identifies the active context. That is, the undo engine identifies, as the active context, any changes implemented in a particular screen by an undo operation.

Next at decision circle 430, the undo engine determines whether a current screen is the particular screen (e.g., contains the most recent configuration changes implemented by the undo operation). If true, then the process flow proceeds to block 440. At block 440, the changes by the undo operation are restored. Otherwise, then the process flow proceeds to block 445.

At block 445, the undo engine navigates to another screen that includes the changes by the undo operation. In this case, there was activity between the last undo operation invocation and the first invocation of the redo operation, such that the particular screen is no longer visible.

At block 450, the redo operation experiences a second invocation. The second invocation can be a user input and/or automation activity.

Next, the process flow proceeds to block 440 and in response to the second invocation of the redo operation, the most recent configuration changes are restored. In this case, the used can directly witness and verify the restoration of the most recent configuration changes.

In view of the disclosure herein, the technical effects and benefits of the context-aware undo-redo service include a better user experience, greater visibility of changes, and meeting expectations for undo/redo features for application design, while directing users to various different "contexts" to guide the user throughout the undo/redo features.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a WTRU, UE, terminal, base station, RNC, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
   a memory configured to store processor executable instructions for an application development platform and a context-aware undo-redo service of the application development platform; and
   a processor coupled to the memory,
   wherein the processor is configured to execute the processor executable instructions to cause the computing device to:
      receive a first invocation of an undo operation with respect to environment variables, wherein the environment variables are values that are entered by a user via a particular form that is displayed within a particular screen of a computer application;
      in response to the first invocation, navigate to the particular screen that contains the particular form where the values were entered;
      receive a second invocation of the undo operation while the particular screen is displayed to the user; and
      in response to the second invocation, change the particular form to reflect previous values, wherein the particular form is displayed to the user with the previous values.

2. The computing device of claim 1, wherein the context-aware undo-redo service comprises processor executable instructions adapted to control and implement the undo operation, a redo operation, and record and utilize an active context of the computer application.

3. The computing device of claim 2, wherein the redo operation is received via a configuration screen.

4. The computing device of claim 2, wherein the active context comprises a set of user interface circumstances of the application development platform and changes made thereto.

5. The computing device of claim 1, wherein the particular form includes at least one of a shape, visual appearance, and configuration of fields.

6. A method that implements a context-aware undo-redo service of an application development platform, the method comprising:
   receiving, by at least one processor coupled to a memory, a first invocation of an undo operation with respect to environment variables, wherein the environment variables are values that are entered by a user via a particular form that is displayed within a particular screen of a computer application;
   in response to the first invocation, navigating, by the at least one processor according to the particular screen that contains the particular form where the values were entered;
   receiving, by the at least one processor, a second invocation of the undo operation while the particular screen is displayed to the user; and
   executing, by the at least one processor, the second invocation of the undo operation in response to the second invocation, wherein the second invocation of the undo operation changes the particular form to reflect previous values, wherein the particular form is displayed to the user with the previous values.

7. The method of claim 6, wherein the context-aware undo-redo service comprises processor executable instructions adapted to control and implement the undo operation, a redo operation, and record and utilize an active context of the computer application.

8. The method of claim 7, wherein the redo operation is received via a configuration screen.

9. The method of claim 7, wherein the active context comprises a set of user interface circumstances of the application development platform and changes made thereto.

10. The method of claim 6, wherein the particular form includes at least one of a shape, visual appearance, and configuration of fields of an object.

11. A computing program product stored in a non-transitory computer readable medium as processor executable instructions for implementing a context-aware undo-redo service of an application development platform, wherein the processor executable instructions cause at least one processor to execute a method, the method comprising:
   receiving a first invocation of an undo operation with respect to environment variables, wherein the environment variables are values that are entered by a user via a particular form that is displayed within a particular screen of a computer application;

in response to the first invocation, navigating to the particular screen that contains the particular form where the values were entered;

receiving a second invocation of the undo operation while the particular screen is displayed to the user; and executing the second invocation of the undo operation in response to the second invocation, wherein the second invocation of the undo operation changes the particular form to reflect previous values, wherein the particular form is displayed to the user with the previous values.

12. The computing program product of claim 11, wherein the context-aware undo-redo service is adapted to control and implement the undo operation, a redo operation, and record and utilize an active context of the computer application.

13. The computing program product of claim 12, wherein the redo operation is received via a configuration screen.

14. The computing program product of claim 12, wherein the active context comprises a set of user interface circumstances of the application development platform and changes made thereto.

\* \* \* \* \*